(12) United States Patent
Carpenter (10) Patent No.: US 9,002,051 B2
(45) Date of Patent: Apr. 7, 2015

(54) MAIL EXCHANGE TRACKING AND ANALYSIS

(75) Inventor: Michael D. Carpenter, Arlington, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 619 days.

(21) Appl. No.: 13/185,733

(22) Filed: Jul. 19, 2011

(65) Prior Publication Data
US 2012/0051587 A1 Mar. 1, 2012

Related U.S. Application Data

(60) Provisional application No. 61/376,796, filed on Aug. 25, 2010.

(51) Int. Cl.
*G06K 9/00* (2006.01)
*B07C 3/00* (2006.01)

(52) U.S. Cl.
CPC .............. *G06K 9/00154* (2013.01); *B07C 3/00* (2013.01); *G06K 9/00677* (2013.01)

(58) Field of Classification Search
USPC ........................... 382/100, 101, 102
See application file for complete search history.

(56) References Cited

U.S. PATENT DOCUMENTS

| | | | |
|---|---|---|---|
| 6,535,619 B1 * | 3/2003 | Suwa et al. | 382/101 |
| 2008/0192978 A1 * | 8/2008 | Rundle et al. | 382/101 |
| 2009/0034803 A1 * | 2/2009 | Matos | 382/116 |

* cited by examiner

Primary Examiner — Alex Liew (57) ABSTRACT

A system, method, and computer readable medium for mail analysis. A method includes receiving in a data processing system an image of a first mailpiece and associated machine-recognized data. The method includes comparing the machine-recognized data with a target list to determine a match with a target individual. The method includes performing a writer identification process on the image of the first mailpiece when a match is determined between the machine-recognized data and the target individual. The writer identification process produces writer identification data associated with the first mailpiece. The method includes storing the image of the first mailpiece and associated machine-recognized data and writer identification data.

20 Claims, 5 Drawing Sheets

FIG. 5

MAIL EXCHANGE TRACKING AND ANALYSIS

CROSS-REFERENCE TO OTHER APPLICATION

This application claims the benefit of the filing date of U.S. Provisional Patent Application 61/376,796, filed Aug. 25, 2010, which is hereby incorporated by reference.

TECHNICAL FIELD

The present disclosure is directed, in general, to tracking mailpieces.

BACKGROUND OF THE DISCLOSURE

Current mail tracking techniques generally allow only updates of location and status of a mailpiece as it is transported and delivered to a recipient. Effective tracking of mail pieces is desirable.

SUMMARY OF THE DISCLOSURE

Various disclosed embodiments include systems, methods, and computer readable mediums for mail analysis. A method includes receiving an image of a first mailpiece and associated machine-recognized data. The method includes comparing the machine-recognized data with a target list to determine a match with a target individual. The method includes performing a writer identification process on the image of the first mailpiece when a match is determined between the machine-recognized data and the target individual. The writer identification process produces writer identification data associated with the first mailpiece. The method includes storing the image of the first mailpiece and associated machine-recognized data and writer identification data.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The nature of electronic communication is such that monitoring and tracking of digital communication can be performed by exploiting the characteristics of the data and electronic media. Telephone records, wiretaps, text messaging, and electronic mail are easily tracked, via legal and extralegal means, and information gathered under these circumstances can be made available to investigators. With widespread acknowledgement of the ease with which electronic communication can be monitored, individuals that seek to avoid this monitoring, including criminals and terrorists, are shifting communication to traditional means, such as postal delivery. The advantage of postal delivery is the perceived lack of tracking between sender and recipient, the difficulty in monitoring the communication itself, and the possibility to utterly destroy evidence of the communication.

Disclosed embodiments enable the tracking and monitoring of postal and private-carrier communications to the same degree as electronic communications. Various embodiments include a system by which postal messaging may be tracked, monitored, analyzed and redirected. Some embodiments include systems and methods for tracking the exchange of postal items between a target recipient and various senders, identifying relationship networks between senders and other sender/recipients of other deliveries, recording images of mail items under scrutiny, and potentially intercepting specific mail items prior to delivery. Note that while terms such as "postal", "mail", "mail items", "mailpiece", and other similar terms are used to describe specific embodiments, these are intended to include private-courier services, letters, and packages as well as governmental (or quasi-governmental) postal services such as the United States Postal Service.

Figure 1:
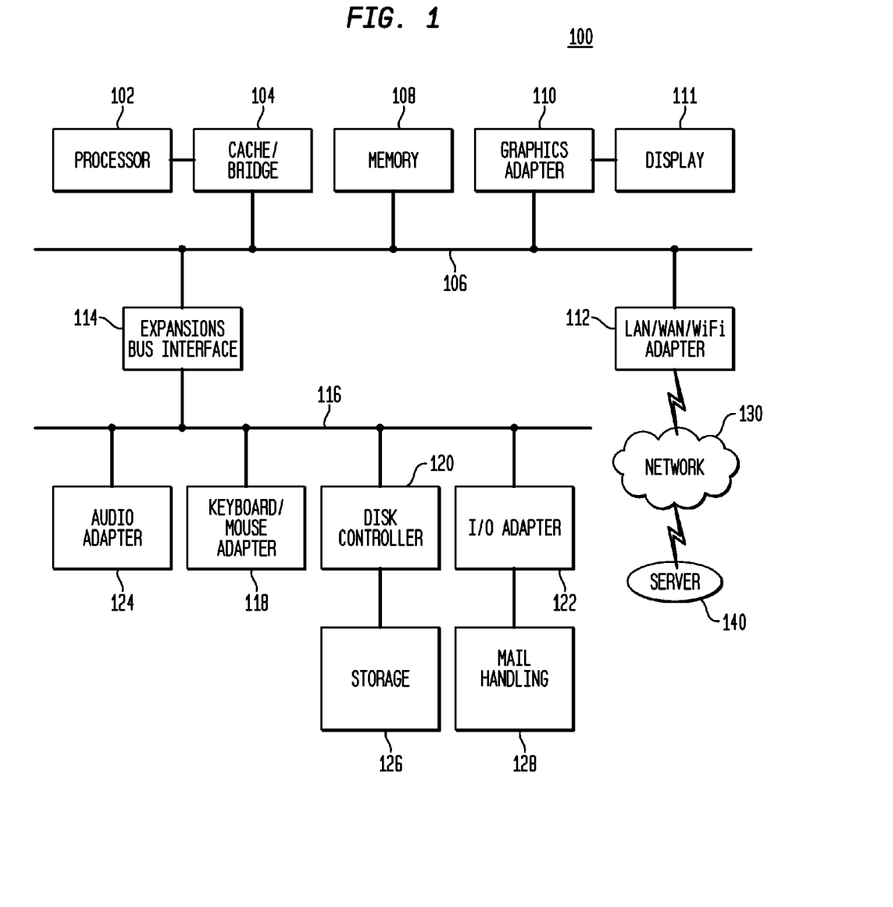
FIG. 1 depicts a block diagram of a data processing system in which an embodiment can be implemented.

FIG. 1 depicts a block diagram of a data processing system 100 in which an embodiment can be implemented, for example as a mail piece tracking and analysis system configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

In particular embodiments, the I/O adapter 122 can be connected to mail handling equipment 128, for processing mailpieces as described below. Mail handling equipment can include sorters, transporters, imagers, printers, and other facing, cancelling, imaging, and processing equipment known to those of skill in the art.

Also connected to the I/O bus 116 in the example shown is an audio adapter 124, to which speakers (not shown) may be connected for playing sounds. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

Postal operational systems for processing and delivering mail allow for different levels of processing depending on the sender and the quantity and manner in which the mail is prepared.

Advertising mail, which is typically many duplicate mail items, presorted according to neighborhoods and delivery stops, bypasses most processing, distribution, and even transportation steps. On the other hand, mail between individuals tends to be individual in content, and requires the broadest range of postal processing. Disclosed embodiments are particularly useful with regard to mail between individuals, which tends to represent specific communication between individuals.

Figure 2:
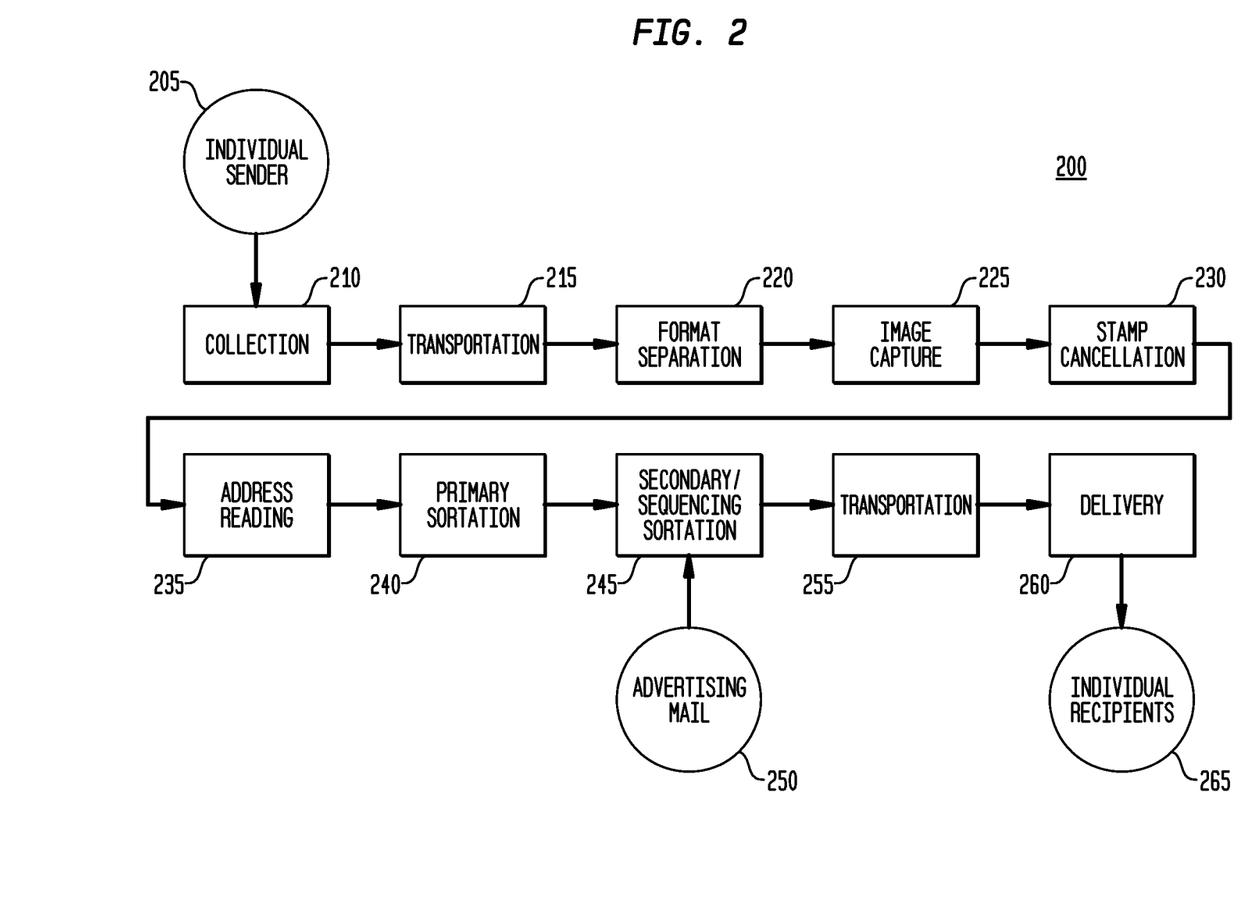
FIG. 2 illustrates a flowchart with a broad range of postal processing for individual mail and advertised mail.

FIG. 2 illustrates a flowchart 200 with a broad range of postal processing for individual mail and advertised mil. Generally, mail between individuals requires all postal processing steps.

An individual sender 205 places a mailpiece for collection 210, for example in a home mail box, central mail box, or post office.

The mailpiece is transported 215 to a processing facility, where is it separated by format 220. This can include, for example, separating letters from flats or parcels. Postal processing systems tend to be specialized according to the size and shape of the mail item. The smallest mail items are flat, letter-sized items, called "letters," which are efficiently processed in highly automated systems, with extensive automatic imaging and related automatic machine-recognition capabilities. The next class of mail is called "flats;" they are flat items that tend to be the size of a magazine. Flats processing is not quite as automated as letters, but they also undergo extensive automatic imaging and machine recognition coincident with their processing. The final principal class of items is called "parcels," which represent items that tend to not be "flat" in their shape, and tend to represent physical goods rather than printed information, as is the case with letters and flats. Since parcels are much larger and are fewer in number than either letters or flats, their processing tends to involve less automation. Nonetheless, a significant portion of parcels undergo automatic imaging and machine recognition as they are processed, particularly those shipped between individuals. While the description herein is specifically directed to processing of letters, the methods apply to flats and parcels as well.

An image of the mailpiece is captured 225, which can include just any labeling on the mailpiece or can include imaging multiple sides of the mailpiece. Any stamps or other postage indicia can be cancelled 230, and the destination address can be read 235, for example by performing an optical character recognition (OCR) process on the mailpiece images, and/or other machine-recognition processes as described herein. In some cases, as described below, the return/sender address can also be read and stored.

In some implementations, a single automated system called a "facer-canceller," can perform processes 220 through 235 in this example. A facer-canceller system as used herein can include high-resolution color imaging, along with sophisticated automatic recognition that checks for authentic stamps, and is capable of recognizing address information, barcodes, logos, and the graphical layout of the item, such that the specific item can be recognized and correlated in subsequent processing. After the facer canceller, the mail items are routed to subsequent automated processing systems, such as primary sortation 240, which sorts the mailpieces to their general geographic delivery area, and secondary sortation 245, which sorts the mailpieces to a more discrete level, for example to a specific delivery route. Advertising mail 250 may be inserted for secondary sortation 245, having been pre-processed for primary sortation.

The mailpieces are then transported 255 to a local delivery point for delivery 260 to the individual recipients 265.

The process from 220 to 245 typically takes up to 10 hours, including the time from when the mailpieces are received at the central processing facility to when they are ready to be transported to local delivery units. This processing time allows for significant offline processing to occur between initial image capture and final sortation, as the mail is being physically prepared for delivery.

Initial image capture can provide a high resolution image, from which important information is derived, as is required for processing.

Figure 3:
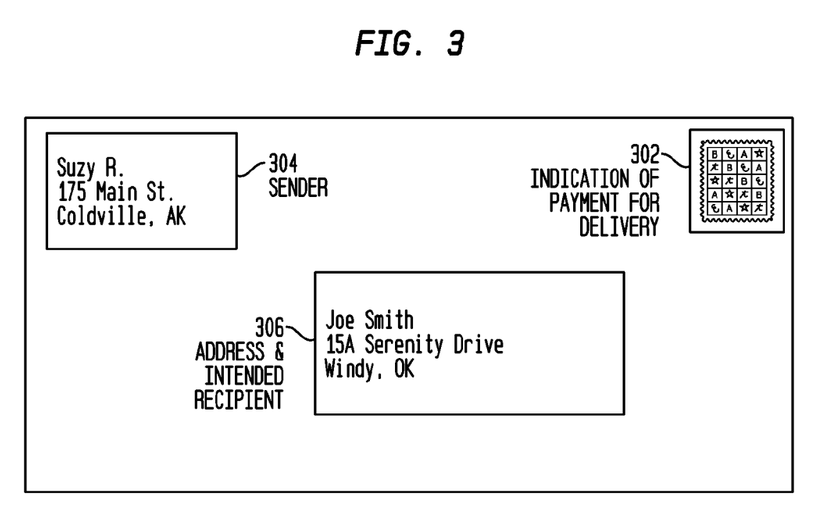
FIG. 3 is an example of a typical mailpiece exchanged between individuals.

FIG. 3 is an example of a typical mailpiece exchanged between individuals, with the information that is available to determine processing and delivery. The stamp or other postage indicia 302 is indication that the cost of the delivery services for the item to which it is affixed has been paid. The system analyzes the image of the stamp to authenticate the stamp, and the stamp can be cancelled to prevent reuse.

The sender address 304 and recipient address 306, as well as the mail class indicated by the indicia 302, are used to determine where the item will be delivered.

For example, if the intended recipient, Joe Smith, has filed a change of address form, mail addressed to him at 15A Serenity Drive will be forwarded to the address specified in the change of address form. In another example, if the item cannot be delivered, the item may be returned to the sender, according to the delivery service paid by the stamp.

The data available for use in traditional postal processing forms the basis for important security-related applications as well, as described herein. Systems and methods as described herein enable authorized security and law enforcement officials (and other parties, as appropriate) to determine the parties with whom a person of interest exchanges mail, records instances of mail exchange between them, establishes networks of those individuals, and intercepts mail items when needed.

Systems as described herein can screen all mail processed through conventional means for named individuals at a given address. At this point, images associated with mail addressed to those specific, named individuals will be subject to additional processing as described herein.

Figure 4:
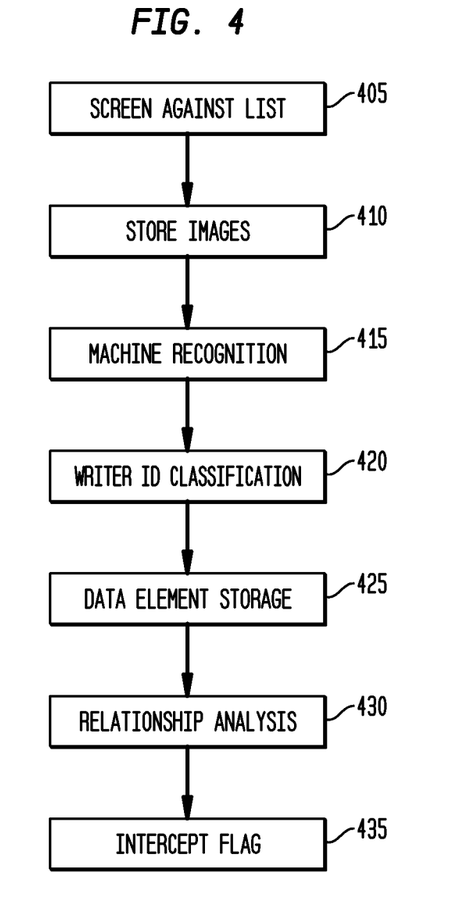
FIG. 4 is a flowchart of various processes in accordance with disclosed embodiments.

FIG. 4 is a flowchart of various processes in accordance with disclosed embodiments that can be performed in addition to the processes of FIG. 2. In various embodiments, the processes of FIG. 2 are performed separately than the processes of FIG. 4, and the processes of FIG. 4 may or may not use data, images, or other information produced in the process of FIG. 2. While this process is described as performed on a single mailpiece, it will be understood that the process can be applied to multiple mailpieces in order to identify the networks of correspondence.

The system screens a mailpiece against a target list of senders and/or recipients to be screened to determine a match (step 405), for example by comparing machine-recognized data of the mailpiece with the target list. The machine-recognized data can include OCR data and/or bar-code recognition (BCR) data of the mailpiece, the OCR data including the addressee address information and/or sender address information, and the BCR data being variously composed of recipient's address information, unique identification, sender's identification, and potentially information regarding the fees paid for the items delivery.

The target list is maintained by the system, and can be updated as described below. Screening mailpieces can occur first at a facer-canceller system, as the mailpiece is being processed as shown in FIG. 2, in particular using the image and machine-recognized data produced using the processing of FIG. 2, and those processes can be considered part of this step. This step can include comparing addressee address information and/or sender address information to a list of target individuals. The addressee address information and/or sender address information can correspond to the mailpiece, and in particular can be determined from an optical-character-recognition process performed on an image of the mailpiece. This process can include receiving the mailpiece image and associated machine-recognized data of the mailpiece.

The system stores the mailpiece images for which the system has determined a match on the list of target individuals (step 410). "Individuals" can include natural persons, companies, organizations or any other sender/addressee that may be a target of processes described herein, including target addresses with or without an individual sender/addressee listed. The stored images can be managed in a secure server, remote from the mail processing machine, or on any other data processing system or server as described herein.

In various embodiments, the target list can store the addresses and other information of target individuals, and addresses and other information for other individuals that are associated with the target individuals. For example, a record for one target individual can include other individuals known to send mailpieces to or receive mailpieces from the target individuals. Further, while the term "list" is used herein, the target list can be maintained in any suitable database or other data structure.

Once stored, the system can perform a machine-recognition process, on the entirety of the mailpiece image (step 415) to produce machine-recognized data, if this process was not already performed when determining the sender/addressee information (for example, if only that information was read at that time). In this way, any other identifying information on the mailpiece is also collected and processed. The machine recognition process can include OCR and BCR processes. The results of this machine-recognition process are also stored.

The system can perform a writer identification (ID) process on the mailpiece image (step 320). According to various embodiments, writer identification algorithms develop feature vectors for the author(s) who have written on the surface of the mail item. These feature vectors can be used as the basis for deriving biometric information from handwriting. This process produces writer identification data that can be stored as associated with the mailpiece sender (based on the sender-block on the mailpiece), associated with the mailpiece addressee, or both.

In some cases, the writer identification data and/or any machine-recognized data can also be compared to data that identifies wanted individuals, such as criminals, suspected terrorists, and others. Such a comparison can be used to identify the location of a wanted individual (either as sender or recipient) and can be used to identify other individuals that correspond with the wanted individual, as described herein.

The system stores the writer identification data, machine-recognized data, and processing data, such as date and time, for future reference (step 425), and this data remains associated with the image of the mail item. As part of this step, the system can update the target list to reflect the relationship with other individuals identified by the OCR data. For example, if the addressee in the machine-recognized data matches the target list, then the target list can be updated with any machine-recognized data that identifies the sender of the mailpiece, and an indication that this is a known sender to the target individual. Similarly, if the sender in the machine-recognized data matches the target list, then the target list can be updated with any machine-recognized data that identifies the addressee of the mailpiece, and an indication that this is a known addressee from the target individual.

The system performs a relationship analysis on the stored data (step 430). Relationship analysis describes the function of the system whereby networks of correspondence are identified, within which the target individual communicates through the mail, as described in the example below. This step can include identifying multiple senders to the same addressee, and any of those senders that correspond with each other, and identifying multiple addressees from the same sender, and whether any of those addressees correspond with each other. This step can be performed using the target list to identify other known senders or recipients from the target individual.

In various embodiments, the system can also maintain a "whitelist" of individuals or companies that should not be added to the target list or processed for membership in a network. Such a whitelist could include, for example, bulk mailers or advertisers, political figures, or other individuals that may customarily send mail to a large number of people with whom there is no actual personal relationship. Similarly, "protected" groups could be added to a whitelist, to avoid improper tracking of associations such as church or political organization memberships.

The system can also set an "interception" flag so that the mailpiece is intercepted (step 435). This can include indicating to a mail carrier or other individual that the mailpiece is to be manually intercepted, or can include automatically diverting the mailpiece during automated processing.

In some embodiments, the processing of FIG. 4 can occur between initial image capture of the mail items at the facer-canceller and secondary/sequencing sortation (e.g., at a point between steps 225 and 245 of the process of FIG. 2). This allows adequate time for thorough offline processing and analysis, with the capability to intercept selected mail items for physical examination. Intercepted mail items may be opened and images of the contents of each item may be captured. The mail item may or may not be delivered after this point. Preferably, any such interception or inspection of the contents of a mailpiece are performed only with proper legal authority, such as pursuant to a search warrant.

Figure 5:
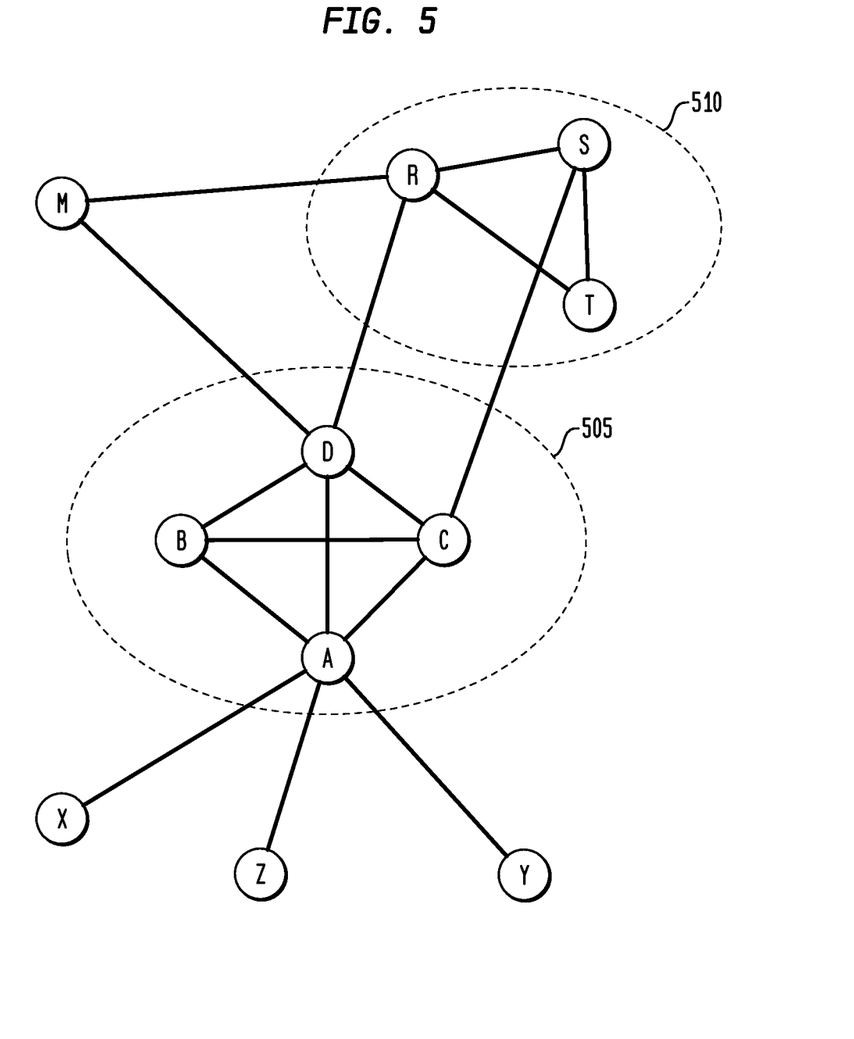
FIG. 5 illustrates an example of a "network" of correspondence in accordance with disclosed embodiments.

FIG. 5 illustrates an example of a "network" of correspondence as described herein. For instance, assume individual "A" is the target, and individual "A" communicates with individuals "B", "C", and "D". Individual "B" communicates with "C" and "D", and individuals "C" and "D" communicate. These communications together represent a simple network 505. Through analysis of such networks, individuals other than targets are processed against name databases to expand or complete information, such as full names and potential aliases.

Each of the additional individuals identified as associated with the target individual can also be added as "targets" on the target list as part of the update described above, so that their mail is analyzed by the system in further mail processing. In the example above, if "A" is the initial target, the system would identify "B" and "C" as other individuals with whom "A" communicates (as either an addressee or sender). By processing "B" and "C" as targets, the system can then identify that "B" and "C" also communicate with each other, and so define a network of mail communications between "A", "B", and "C". Of course, in various implementations, such an identified network can include any number of individuals.

Note, in this example, that "R", "S", and "T" may also be identified as a network of correspondence 510, and because "D" communicates with "R" and "C" communicates with "S", the system can indicate that that networks 505 and 510 may be related networks, may be part of the same overall network, or may be communication "cells" in a larger organization.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto. Various embodiments can include non-transitory computer readable medium having program instructions tangibly stored thereon executable by one or more processors to perform processes as described herein, and non-transitory computer-readable mediums encoded with executable instructions that, when executed, cause one or more data processing systems to together perform processes as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for mailpiece analysis, comprising:
receiving in a data processing system an image of a first mailpiece and associated machine-recognized data of the first mailpiece;

comparing the machine-recognized data of the first mailpiece, by the data processing system, with a target list to determine a match with a target individual;

performing a writer identification process on the image of the first mailpiece when a match is determined between the machine-recognized data of the first mailpiece and the target individual, the writer identification process producing writer identification data associated with the first mailpiece; and storing the image of the first mailpiece and associated machine-recognized data and writer identification data by the data processing system.

2. The method of claim 1, wherein the associated machine-recognized data includes addressee information and sender information for the mailpiece.

3. The method of claim 1, wherein the match is determined between addressee information of the machine-recognized data, and the data processing system updates the target list with sender information of the machine-recognized data to indicate a known sender to the target individual.

4. The method of claim 1, wherein the match is determined between sender information of the machine-recognized data, and the data processing system updates the target list with addressee information of the machine-recognized data to indicate a known addressee of the target individual.

5. The method of claim 1, wherein the writer identification process includes developing feature vectors from the image of the first mailpiece and associating the feature vectors with sender information of the machine-recognized data.

6. The method of claim 1, wherein the data processing system performs a relationship analysis on the stored machine-recognized data, including the target list, to identify networks of correspondence between multiple individuals.

7. The method of claim 6, wherein the relationship analysis includes identifying multiple senders to the same addressee.

8. The method of claim 7, wherein the relationship analysis includes identifying ones of the multiple senders that correspond with each other.

9. The method of claim 6, wherein the relationship analysis includes identifying multiple addressees from the same sender.

10. The method of claim 1, wherein the data processing system sets an interception flag associated with the first mailpiece indicating that the mailpiece is to be intercepted before delivery.

11. The method of claim 10, wherein the data processing system causes the mailpiece to be diverted for interception during automated processing.

12. The method of claim 1, further comprising capturing images of the contents of the intercepted first mailpiece.

13. A data processing system, comprising:
a processor; and
a memory accessible by the processor, the data processing system particularly configured to
receive an image of a first mailpiece and associated machine-recognized data of the first mailpiece;
compare the machine-recognized data of the first mailpiece with a target list to determine a match with a target individual;
perform a writer identification process on the image of the first mailpiece when a match is determined between the machine-recognized data of the first mailpiece and the target individual, the writer identification process producing writer identification data associated with the first mailpiece; and
store the image of the first mailpiece and associated machine-recognized data, processing data, and writer identification data.

14. The data processing system of claim 13, wherein the match is determined between addressee information of the machine-recognized data, and the target list is updated with sender information of the machine-recognized data to indicate a known sender to the target individual.

15. The data processing system of claim 13, wherein the match is determined between sender information of the machine-recognized data, and the target list is updated with addressee information of the machine-recognized data to indicate a known addressee of the target individual.

16. The data processing system of claim 13, wherein the data processing system is configured to perform a relationship analysis on the stored machine-recognized data, including the target list, to identify networks of correspondence between multiple individuals.

17. The data processing system of claim 13, wherein the data processing system is configured to set an interception flag associated with the first mailpiece indicating that the mailpiece is to be intercepted before delivery.

18. A non-transitory computer readable medium having program instructions stored thereon executable by one or more processors to:
receive an image of a first mailpiece and associated machine-recognized data of the first mailpiece;
compare the machine-recognized data of the first mailpiece with a target list to determine a match with a target individual;
perform a writer identification process on the image of the first mailpiece when a match is determined between the machine-recognized data of the first mailpiece and the target individual, the writer identification process producing writer identification data associated with the first mailpiece; and
store the image of the first mailpiece and associated machine-recognized data and writer identification data.

19. The computer-readable medium of claim 18, wherein the instructions are also executable by the processors to perform a relationship analysis on the stored machine-recognized data, including the target list, to identify networks of correspondence between multiple individuals.

20. The computer-readable medium of claim 18, wherein the writer identification data is used to identify an individual on a wanted list.

* * * * *